United States Patent
Elsby

[11] 3,823,732
[45] July 16, 1974

[54] VALVE

[76] Inventor: Ian Eric Elsby, Linketty House, Pine Rd., Tokai, Cape Town, South Africa

[22] Filed: June 30, 1972

[21] Appl. No.: 268,199

[30] Foreign Application Priority Data
July 2, 1971 South Africa............................ 4369

[52] U.S. Cl.................. 137/436, 137/443, 137/446, 181/33 S
[51] Int. Cl............................................ F16k 31/24
[58] Field of Search ........... 137/386, 389, 434, 436, 137/437, 440, 441, 442, 443, 444, 445, 446; 181/33 S, 47 R

[56] References Cited
UNITED STATES PATENTS
| | | | |
|---|---|---|---|
| 996,743 | 7/1911 | Yancey | 137/436 |
| 1,158,743 | 11/1915 | Swanberg | 137/436 X |
| 2,895,499 | 7/1959 | Nelson | 137/446 |
| 3,586,288 | 6/1971 | Gulich | 137/436 X |

Primary Examiner—Alan Cohan
Assistant Examiner—David R. Matthews
Attorney, Agent, or Firm—Karl W. Flocks

[57] ABSTRACT

A liquid flow control valve is disclosed which comprises a silencing chamber into which an inlet member opens. The mouth of the inlet member is flared and constitutes a valve seat. A closure member cooperates with the seat to control liquid flow through the inlet member into the chamber. The closure member is moved to the closed position by a cam, and the cam is moved by a float. When the float drops the pressure in the inlet member urges the closure member away from the seat to open the valve. The silencing chamber is open at the top and this open top constitutes the outlet from the chamber. The chamber forms one upright limb of an inverted U-bend. In use the silencing chamber is always full. Means for creating turbulent flow into the chamber are provided on the valve closure member.

13 Claims, 3 Drawing Figures

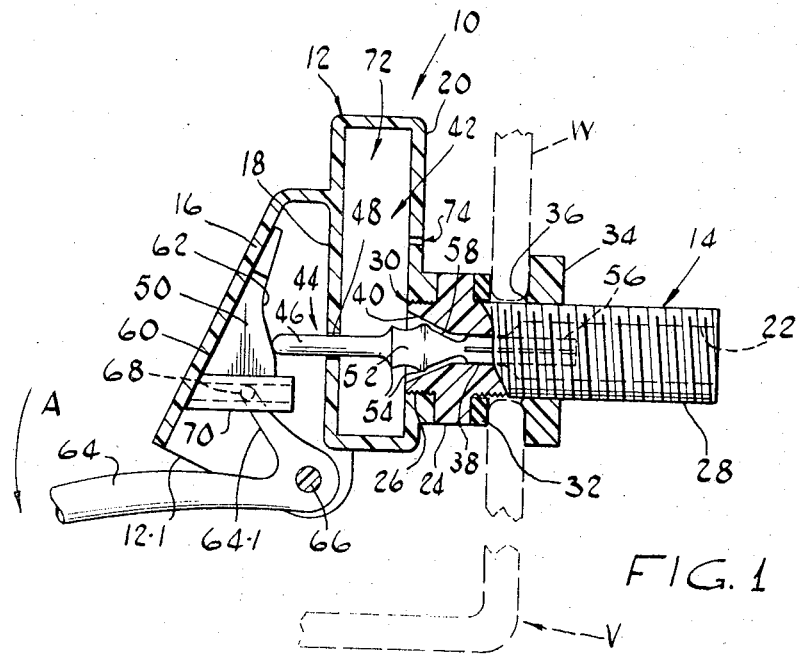
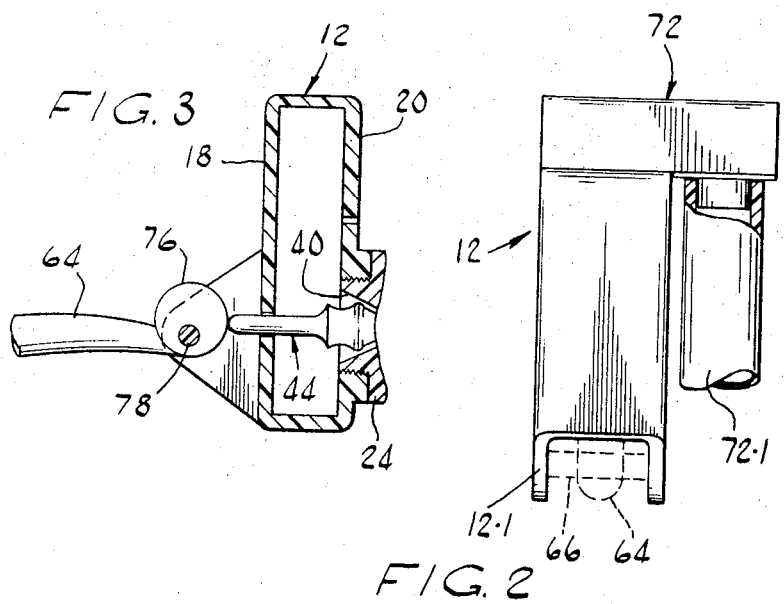

VALVE

This invention relates to liquid flow control valves.

According to the present invention there is provided a valve for controlling flow of liquid from a supply into a vessel, the valve comprising means defining a silencing chamber, an inlet member for connection to said supply, and an outlet, the inlet member opening into said chamber below the outlet and the chamber, in use, being liquid filled, a valve closure member co-operating with a seat to control flow of liquid through the inlet member into the chamber, and means for displacing the valve seat and closure member relatively to one another between a closed position in which the member bears on the seat and an open position in which the seat and member are spaced apart, the arrangement being such that, in use, when the valve is open, the incoming liquid flows into the liquid filled silencing chamber before flowing into said vessel via said outlet.

In the preferred constructional form the chamber forms one of the upright limbs of an inverted U-bend, the free end of the other limb of the U-bend being open and, in use, communicating with said vessel.

In this form said outlet is constituted by the upper end of said chamber which is open, there being a laterally extending chamber into which said outlet opens, said other limb leading downwardly from that part of the laterally extending chamber which is to one side of said outlet.

Means can be provided for creating turbulance in the liquid flowing into said chamber through the inlet. Such means can be a single circular rib on the valve closure member, but it is preferred to provide a pair of circular ribs with a concave depression between them.

Preferably, the valve closure member is displaced with respect to said seat by a cam, and the cam is connected to a float arm. In one form the cam is rotatable and directly connected to the float arm. In another form the cam is arranged to be displaced linearly by the float arm, and includes a cam surface which co-operates with said member, the cam surface being shaped so as to obtain rapid closing-off initially and slower closing-off during the final stages of closing.

For a better understanding of the present invention, and to show how the same may be carried out into effect, reference will now be made, by way of example, to the accompanying drawing in which:

FIG. 1 is a vertical section through a first form of valve shown in a slightly open condition;

FIG. 2 is an elevation of the valve of FIG. 1; and

FIG. 3 is a vertical section through a second form of valve.

Referring firstly to FIG. 1, the valve illustrated is generally indicated by the reference numeral 10 and includes a valve housing 12 and a tubular inlet member 14. The member 14 passes through an aperture in the wall W of the vessel V and the valve serves to feed water to, and control the water level in, this vessel. The vessel V can be a cistern.

The valve housing 12 has a front wall 16, a partition wall 18 and a rear wall 20. The tubular inlet member 14 has a bore 22 and is formed externally with a shoulder 24. Screw-threaded portions 26 and 28 are provided on each side of the shoulder 24. The screw-threaded portion 28 is intended for connection to a supply of liquid e.g. water, and the threaded portion 26 is screwed into a threaded hole 30 in the rear wall 20. A sealing ring 32 is provided between the shoulder 24 and the wall W and is compressed between the internal surface of the wall W and the shoulder 24 when a lock nut 34 screwed onto the portion 28 is tightened against the external surface of the wall W. It will be noted that the nut 34 has a circular protrusion 36 which enters the aperture in the wall W.

The bore 22 is not of constant internal diameter but includes a portion 38 of reduced diameter which connects the main portion of the bore to a flared mouth 40. The mouth 40 opens into the lower part of a silencing chamber 42 defined between the walls 18 and 20, and a valve closure member 44 serves to control communication between the bore 22 and the chamber 42. The closure member 44 has a cylindrical portion 46 which passes through an aperture 48 in the wall 18 and its left hand end co-operates with a cam in the form of a wedge element 50. The cylindrical portion 46 of the valve member 44 is free to slide in the aperture 48.

The mid-portion 52 of the member 44 is of greater diameter than the remainder and is formed with two circular ribs 54 the right hand one of which is of slightly greater diameter than the other and the periphery of which is, in cross section, rounded. Between the ribs 54 the mid-portion 52 is depressed so as to present a concave configuration.

The right hand part 56 of the member 44 is in the form of a flight and serves to guide the member by sliding in the bore portion 38. More specifically, the part 56 is, in cross section, of cross-like configuration with a central core and four ribs extending outwardly from the core. A frusto-conical portion 58 connects the right hand rib 54 to the part 56.

The wedge element 50 has an inclined face 60 and a face 62 which co-operates with the rounded end of the portion 46. The wall 16 and the face 60 slope at the same angle and co-operate with one another. The face 62 is generally inclined in the opposite sense to the face 60 and is formed with a lower bulge. The shape of the face 62 is designed to obtain desirable operating characteristics as will be described in more detail hereinafter.

The element 50 is connected to a float arm 64 which is pivotally mounted on the housing 12 by means of a pin 66 which spans the gap between the side walls 12.1 of the housing 12. The free end of the arm 64 carries a float (not shown). The arm 64 includes a bell-crank like extension 64.1 and at the free end of this there is a transverse pin 68. The wedge element 50 is I-shaped in cross-section and the lower flange 70 of the element 50 is formed with a T-shaped slot. This slot is downwardly open at the lower end of the "upright" of the T. The pin 68 slides horizontally in the "cross-bar" of the T-shaped slot with the extension 66 moving in the "upright" of the slot.

The upper end of the chamber 42 is open and this open upper end constitutes the chamber's outlet. The outlet leads to a laterally extending upper chamber 72 (FIG. 2). The part of the chamber 72 which projects laterally beyond the chamber 42 communicates with a downwardly extending outlet pipe 72.1 The chambers 42 and 72 and the downpipe 72.1 define an inverted U-bend of rectangular channel-shape with the chamber 42 and the pipe 72.1 defining the upright limbs and the chamber 72 the connecting cross-bar. The pipe 72.1 is downwardly open and communicates with vessel V.

An anti-syphoning hole 74 is formed in the wall 20 above the inlet member 14.

When the vessel V has therein the desired amount of water, the valve is held in its closed position. More specifically, the arm 64 exerts an upward force due to the buoyancy of the float which holds the element 50 in its raised position in which it is cammed to the right by the sloping, internal face of the wall 16 and thus presses the member 44 to the right. The right hand rib 54 therefore seats on the flared mouth 40 and closes the bore 22 to prevent water flowing into the chamber 42 through the inlet member 14. It will be understood that there is a further force acting on the valve which force results from the pressure in the bore 22. This force holds the member 44 against the face 62 of the wedge element 50 which is itself thrust against the sloping, internal face of the wall 16.

When water is withdrawn from the vessel V, the level therein drops and the float follows the water level downwardly. Thus the arm 64 pivots about the pin 66 in the direction indicated by the arrow A and pulls the wedge element 50 downwardly. As the member 44 subjects the wedge element to a force acting from right to left, as viewed in the drawing, the wedge element not only moves downwardly but also moves slightly to the left so that its face 60 remains in contact with the face of the wall 16. Thus there is a tendency for the entire face 62 to move to the left as the element 50 moves downwardly thereby permitting the member 44 to move to the left under the action of the force derived from the water pressure in the inlet bore 22. Superimposed on this leftwards movement of the member 44 is a movement of greater magnitude which is permitted by the shape of the face 62. More specifically, as the member 50 moves downwardly, the member 44, which, in the valve's closed condition co-operates with the "bulge" of the face 62, cooperates with the concave recess above the bulge. The valve thus moves to the condition illustrated in which the right hand rib 54 is spaced from the mouth 40 and the valve is open.

Water thus flows into the chamber 42 and, by way of the chamber 72 and the downpipe 72.1, into the vessel V containing the float. It will be understood that as the vessel V fills the arm 64 turns in a clockwise direction about the pin 66 to lift the wedge element 50. The rising wedge element is forced to the right by the wall 16 and the face 62 moves upwardly with respect to the portion 46. Thus the member 44 is cammed to the right, first at a fairly rapid rate as the part of the surface 62 leading to its "bulge" co-operates with the portion 46 and thereafter, as the "bulge" comes into co-operation with the portion 46, at a slower rate until final closing-off against the water pressure is obtained.

It will be noted that the chamber 42 remains full at all times. As a result of this the valve is substantially silent in operation, virtually no water rush noises being discernable to the un-aided ear. The circular ribs 54 and the depression between them constitute means which have the effect of creating turbulence in the water flowing through the annular gap which exists between the mouth 40 and member to the substantially silent operation of the valve.

Turning now to FIG. 3, the valve illustrated in that Figure has many parts in common with that illustrated in FIGS. 1 and 2, and where applicable like references have been used. In this form, however, the linearly movable cam constituted by the wedge element 50 is replaced by a rotatable cam 76 which is eccentrically mounted on a pin 78. As the float connected to the rod 64 falls, the cam 76 turns about its mounting to increase the distance between the periphery of the cam and the mouth 40 of the inlet member 14. The pressure exerted on the member 44 by the water in the bore of the member 14 causes the member 44 to follow the cam as it turns anti-clockwise thereby opening the valve. Closing of the valve as the float rises is obtained by the cam forcing the member 44 to the right. It will be noted that the cam should be arranged, so far as possible, to exert an axial force on the member 44 to avoid the possibility of a non-axial force wedging the member in the bore portion 38.

I claim:

1. A valve for controlling flow of liquid from a supply into a vessel, the valve comprising means defining a silencing chamber, an inlet member for connection to said supply, and an outlet, the inlet member opening laterally into said chamber below the outlet and the chamber extending downwardly below the region where the inlet opens into the chamber, and the chamber in use being liquid filled, a valve seat, a valve closure member co-operating with said seat to control flow of liquid through the inlet member into the chamber, means for displacing the closure member relatively to the valve seat between a closed position in which the member bears on the seat and an open position in which the seat and member are spaced apart, the arrangement being such that, in use, when the valve is open, the incoming liquid flows into the liquid filled silencing chamber before flowing into said vessel via said outlet.

2. A valve according to claim 1, in which the inlet member has a flared mouth which flared mouth opens into said chamber and constitutes said seat.

3. A valve according to claim 1, and including means for creating turbulance in the liquid flowing into said chamber through the inlet member.

4. A valve according to claim 3 in which said inlet member has a flared mouth which flared mouth opens into said chamber and constitutes said seat, and in which said means for creating turbulance is formed on said closure member.

5. A valve according to claim 4, in which said means for creating turbulance comprises at least one circular rib formed on said valve closure member.

6. A valve according to claim 5, in which said circular rib seats on said flared mouth to close the valve.

7. A valve according to claim 5, in which said means for creating turbulance comprises a pair of circular ribs, said ribs being spaced apart and having a concave depression between them.

8. A valve according to claim 1, in which an anti-syphoning aperture is formed in the wall of said chamber which leads into said chamber above said inlet and below said outlet.

9. A valve for controlling flow of liquid from a supply into a vessel, the valve comprising means defining a silencing chamber, an inlet member for connection to said supply, and an outlet, the inlet member opening into said chamber below the outlet and the chamber, in use, being liquid filled, a valve seat, a valve closure member co-operating with said seat to control flow of liquid through the inlet member into the chamber, and a cam operated by a float arm for displacing the closure member relatively to the valve seat between a closed position in which the member bears on the seat and an open position in which the seat and member are spaced apart, the cam being arranged to be displaced linearly by the float arm and including a cam surface which co-operates with said member, the cam surface having means shaped so as to obtain rapid closing-off initially and slower closing-off during the final stages of closing, the arrangement being such that, in use, when the valve is open, the incoming liquid flows into the liquid filled silencing chamber before flowing into said vessel via said outlet.

10. A valve for controlling flow of liquid from a supply into a vessel, the valve comprising walling defining a chamber having a first upright limb, a second upright limb laterally positioned with respect to the first limb and an overhead passage connecting the upper ends of the limbs, an inlet member leading to an inlet formed in the walling of the first limb below the junction between the overhead passage and the first limb, the limbs and passage forming a substantially unrestricted flow path from said inlet to the free end of the second limb, an anti-syphoning aperture in the walling of said first limb above the inlet and below said junction for placing the first limb in communication with atmosphere, a valve closure member, a valve seat encircling said inlet, and means for urging said member against said seat to close off communication between the inlet member and the first limb.

11. A valve according to claim 10, in which said inlet opens laterally into said first limb and said closure member extends across the first limb and is guided in a bore of that vertical wall of the first limb opposed to the wall through which said inlet opens, there being externally of said first limb, and laterally thereof, cam means for displacing said closure member into engagement with said seat.

12. A valve according to claim 11, in which said closure member is free-floating, said cam means displacing it into engagement with said seat, and the pressure in said inlet urging it against the cam.

13. A valve according to claim 12, in which said closure member includes a finned portion passing through said seat and entering said inlet member to guide the closure member during its opening and closing movements.

* * * * *